US008220976B2

(12) United States Patent
Liu et al.

(10) Patent No.: US 8,220,976 B2
(45) Date of Patent: Jul. 17, 2012

(54) LED LAMP

(75) Inventors: Jun Liu, Shenzhen (CN); Yong-Dong Chen, Shenzhen (CN); Shih-Hsun Wung, Taipei Hsien (TW)

(73) Assignees: Fu Zhun Precision Industry (Shen Zhen) Co., Ltd., Shenzhen, Guangdong Province (CN); Foxconn Technology Co., Ltd., Tu-Cheng, New Taipei (TW)

( * ) Notice: Subject to any disclaimer, the term of this patent is extended or adjusted under 35 U.S.C. 154(b) by 447 days.

(21) Appl. No.: 12/507,083

(22) Filed: Jul. 22, 2009

(65) Prior Publication Data

US 2010/0284195 A1 Nov. 11, 2010

(30) Foreign Application Priority Data

May 11, 2009 (CN) .......................... 2009 1 0302218

(51) Int. Cl.
*B60Q 1/06* (2006.01)

(52) U.S. Cl. ........ 362/373; 362/218; 362/221; 362/294; 362/800

(58) Field of Classification Search ............... 362/217.1, 362/218, 221, 234, 294, 373, 800
See application file for complete search history.

(56) References Cited

U.S. PATENT DOCUMENTS

2003/0030977 A1* 2/2003 Garnett et al. ................ 361/687
2007/0171353 A1* 7/2007 Hong ............................ 349/161
2009/0103294 A1* 4/2009 Zhang et al. .................. 362/234
* cited by examiner

*Primary Examiner* — Stephen F Husar
*Assistant Examiner* — Meghan Dunwiddie
(74) *Attorney, Agent, or Firm* — Altis Law Group, Inc.

(57) ABSTRACT

An LED lamp includes a heat sink, an LED module, a driving circuit module, a top cover, and a bottom cover. The LED module is mounted on a top side of the heat sink. The driving circuit module is mounted on a bottom side of the heat sink. The top cover is slidably engaged with the heat sink and covers the LED module. The bottom cover is sliably engaged with the heat sink and covers the driving circuit module.

18 Claims, 4 Drawing Sheets

LED LAMP

BACKGROUND

1. Technical Field

The disclosure relates to LED lamps and, more particularly, to an LED lamp having a cover capable of being conveniently assembled to and disassembled from a heat sink thereof.

2. Description of Related Art

Generally, an LED lamp comprises a heat sink, a plurality of LEDs mounted on the heat sink, a cover covering the LEDs and assembled on the heat sink by a plurality of screws. The screws are assembled to and disassembled from the heat sink one by one by a technical tool. This is very time-consuming and trouble.

What is needed, therefore, is an LED lamp having a cover capable of being conveniently assembled to and disassembled from a heat sink thereof, thereby overcoming the above-described problems.

DETAILED DESCRIPTION

Figure 1:
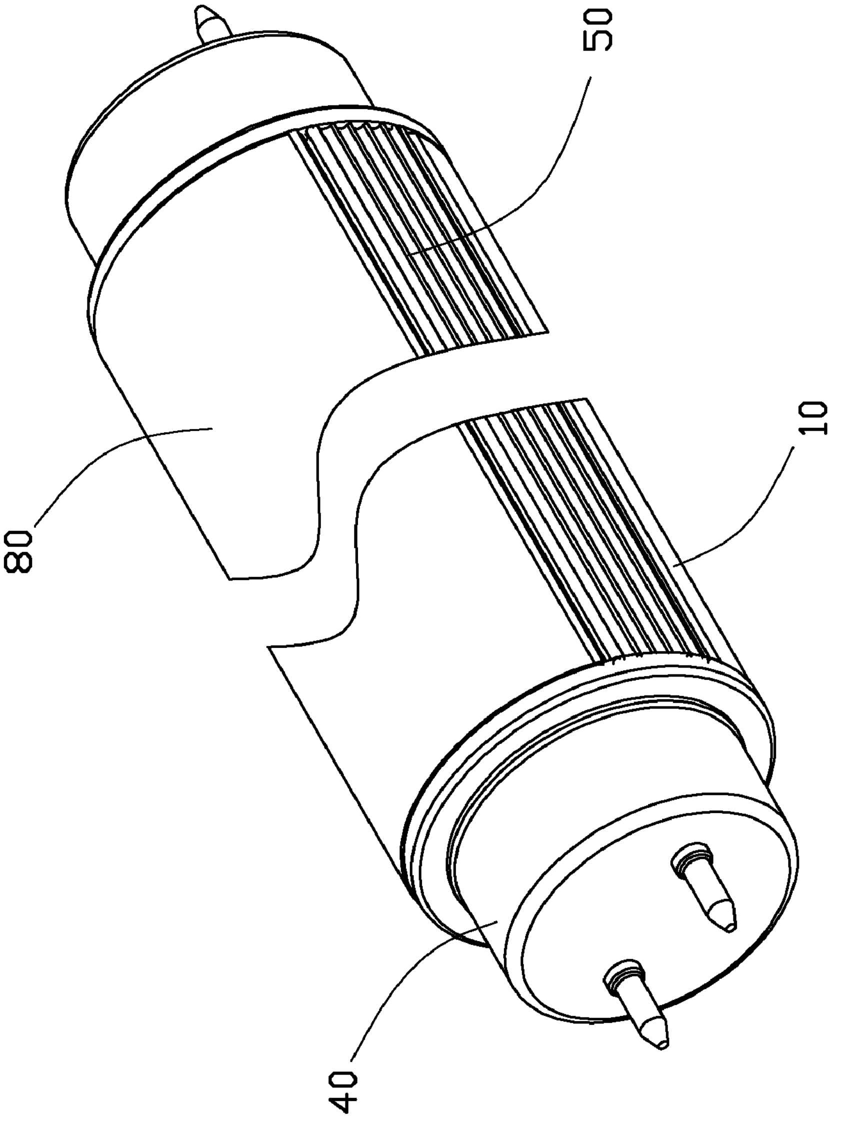
FIG. 1 is an assembled view of an LED lamp in accordance with an embodiment of the present disclosure.
Figure 2:
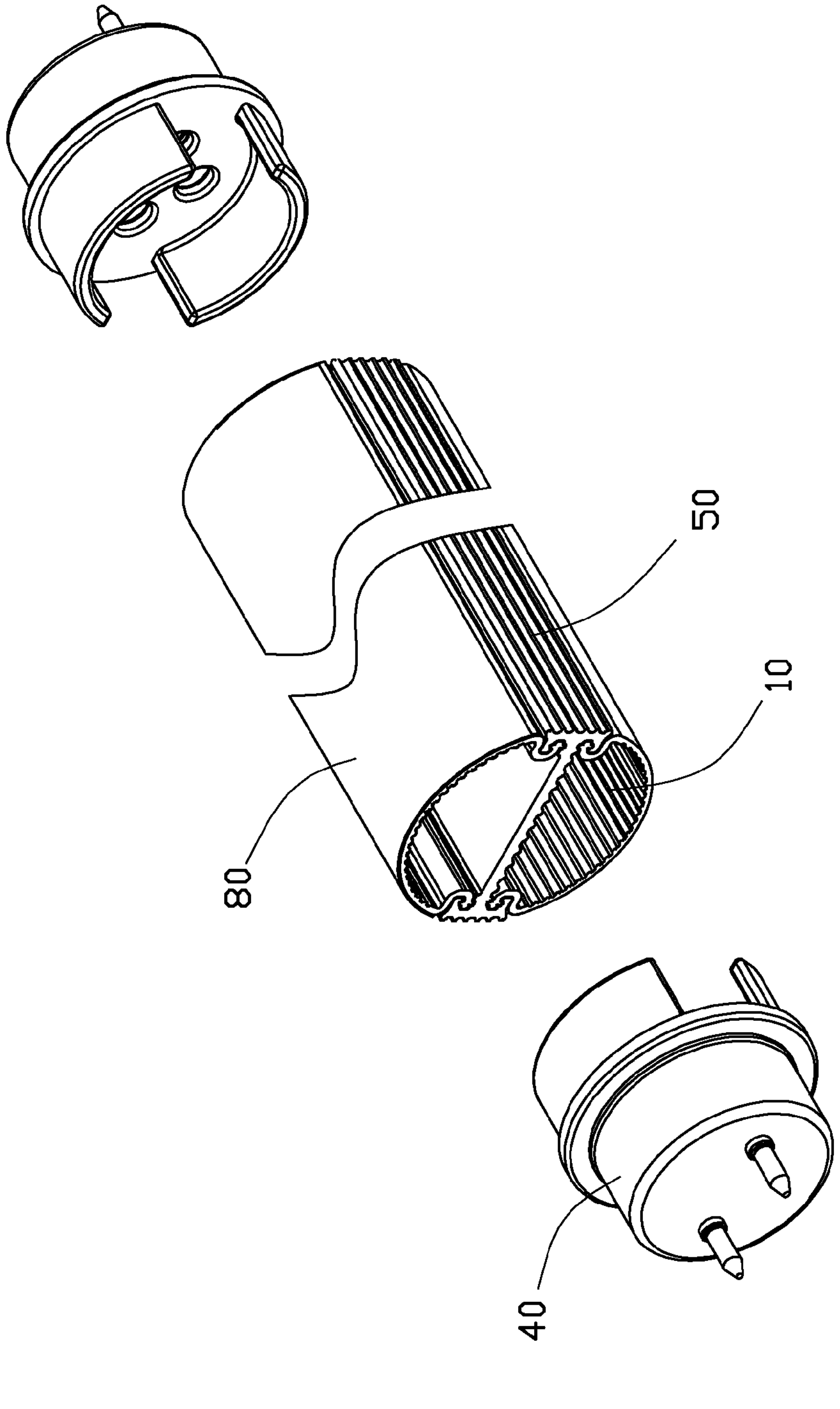
FIG. 2 is a partly assembled view of the LED lamp of FIG. 1, wherein two holders are taken away from the LED lamp for clarity.
Figure 3:
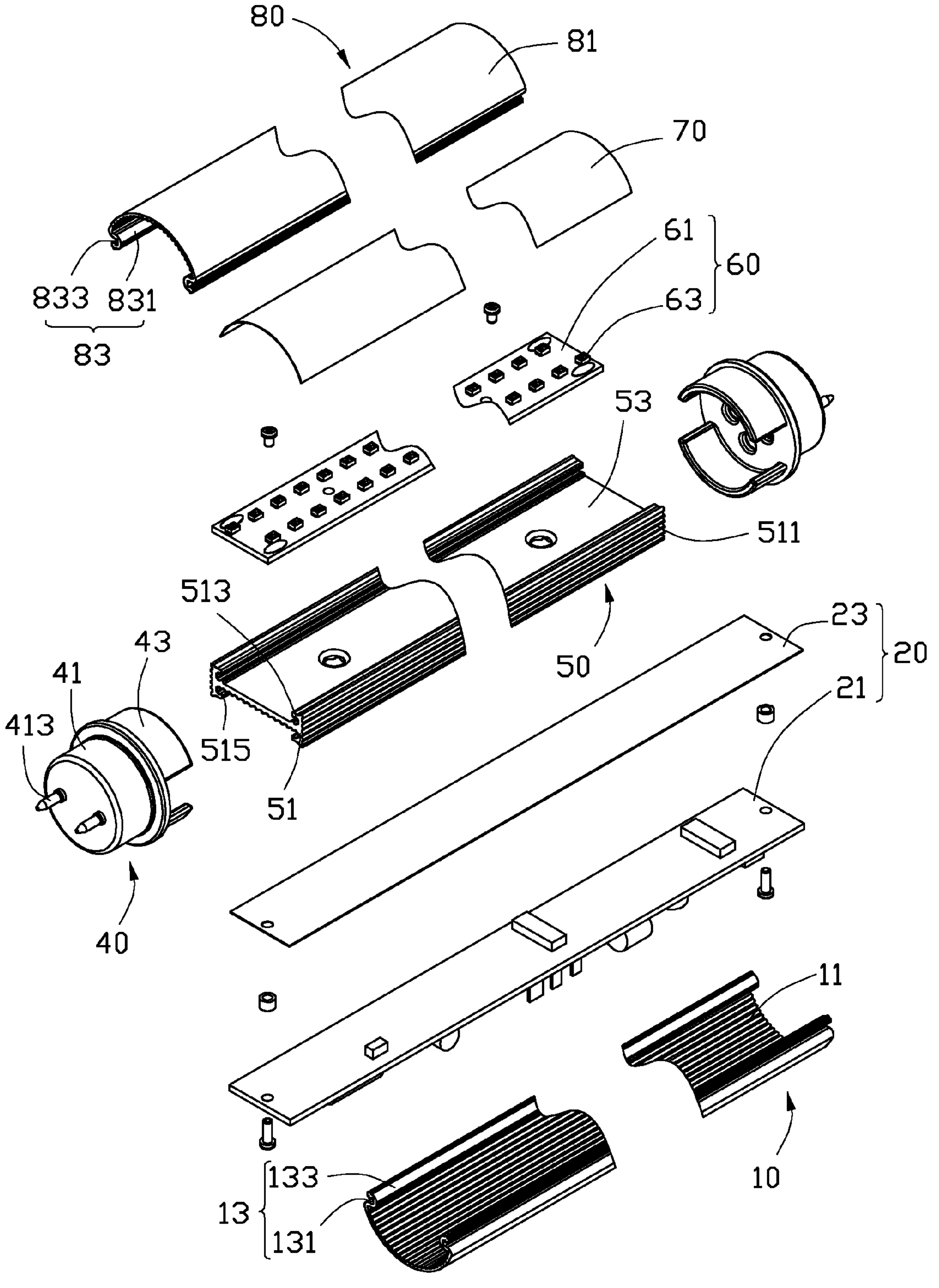
FIG. 3 is an exploded view of the LED lamp of FIG. 1.
Figure 4:
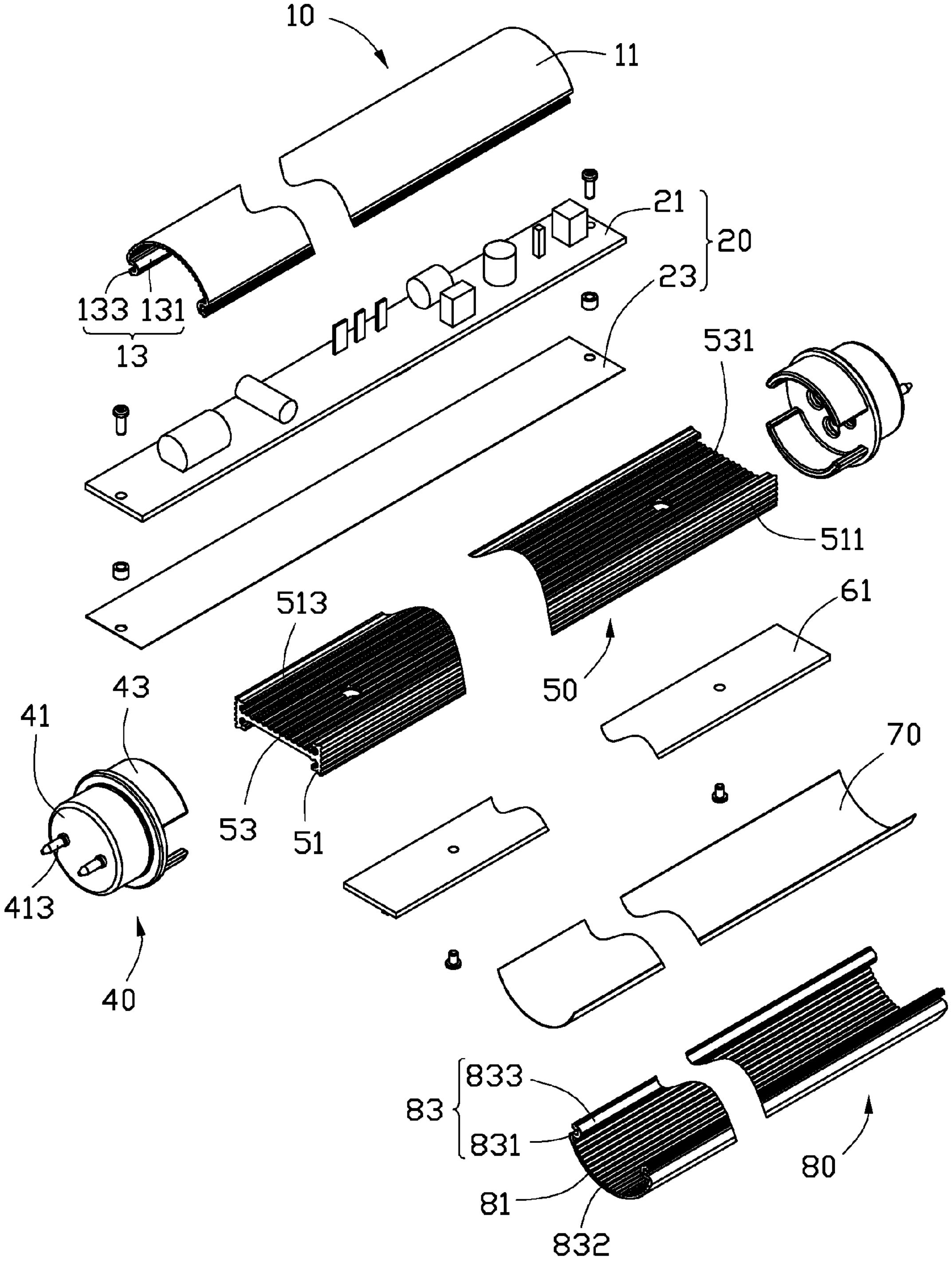
FIG. 4 is an inverted view of FIG. 3.

Referring to FIGS. 1-3, an embodiment of an LED lamp comprises two holders 40, a heat sink 50 between the two holders 40, an LED module 60 mounted on a top side of the heat sink 50, a driving circuit module 20 mounted on a bottom side of the heat sink 50, a top cover 80 and a bottom cover 10 fixed on opposite sides of the heat sink 50 and covering the LED module 60 and the driving circuit module 20, respectively, and an elongated diffuser 70 received in the top cover 80 and facing the LED module 60.

The heat sink 50 is integrally formed by aluminum extrusion and comprises two spaced, elongated heat dissipating plates 51 and an elongated heat absorbing plate 53. The two heat dissipating plates 51 face and are parallel to each other and sandwich the heat absorbing plate 53 therebetween. The heat absorbing plate 53 perpendicularly connects central portions of the two heat dissipating plates 51 along a length direction thereof. A plurality of spaced fins 511 extends outwardly from outer surfaces of the heat dissipating plates 51 along the length direction of the heat dissipating plates 51 to dissipate heat of the heat sink 50. Two extending portions 513 perpendicularly extend from top and bottom ends of the heat dissipating plate 51 and are oriented toward the other heat dissipating plate 51. The extending portions 513 also extend along the length direction of the heat dissipating plate 51. Thus, each of the extending portions 513 and the heat absorbing plate 53 define a guiding groove 515 therebetween.. The top surface of the heat absorbing plate 53 supports the LED module 60. A plurality of fins 531 extends downwardly from the bottom surface of the heat absorbing plate 53.

The LED module 60 comprises an elongated printed circuit board 61 and a plurality of LEDs 63 mounted on the printed circuit board 61. The LEDs 63 are arranged in two neat rows along a length direction of the printed circuit board 61. The printed circuit board 61 is fixed on a central portion of the top surface of the heat absorbing plate 53 of the heat sink 50.

The driving circuit module 20 comprises a driving member 21 and an elongated connecting plate 23. The connecting plate 23 is a metal plate and mounted on a central portion of the bottom surface of the heat absorbing plate 53 of the heat sink 50. The driving member 21 is thermally mounted on the connecting plate 23 and electronically connects with the LED module 60 and a powder source (not shown).

The top cover 80 is made of a transparent or translucent polycarbonate. The top cover 80 comprises an arc-shaped covering portion 81 and two U-shaped engaging portions 83 extending downwardly from bottom edges of the covering portion 81, respectively. The covering portion 81 faces the LED module 60. The U-shaped engaging portions 83 open toward two opposite lateral sides of the top cover 80, respectively. A number of elongated protruded portions 832 extend downwardly from an inner surface of the covering portion 81 and along a length direction of the covering portion 81. The protruded portions 832 reflect and refract light emitted from the LEDs 63 of the LED module 60 to make the light be evenly distributed. The two engaging portions 83 engage in the two guiding grooves 515 of the heat sink 50 which are located at the top side of the heat sink 50. Each of the engaging portions 83 comprises an arc-shaped first extending plate 831 and an arc-shaped second extending plate 833. The first extending plate 831 extends inwardly from the bottom edge of the covering portion 81. The second extending plate 833 extends outwardly from a bottom end of the first extending plate 831. The first extending plate 831 form a U-shaped opening (not labeled) which is oriented towards a corresponding lateral direction of the top cover 80. The second extending plate 833 of the engaging portion 83 is received in a corresponding guiding groove 515 of the heat sink 50 and is slidable along the guiding groove 515. The extending portion 513 of the heat sink 50 is received in the U-shaped opening of the first extending plate 831.

The diffuser 70 is a translucent sheet and diffuses light emitted from the LEDs 63 of the LED module 60. The diffuser 70 is bended to have an arced configuration and received in the covering portion 81 of the top cover 80. Opposite lateral sides of the diffuser 70 abut against inner faces of the two first extending plates 831, respectively.

The bottom cover 10 is made of translucent polycarbonate and has a configuration the same as that of the top cover 80. The bottom cover 10 comprises an arc-shaped covering portion 11 and two U-shaped engaging portions 13 extending upwardly from top edges of the covering portion 11, respectively. The covering portion 11 covers the driving circuit board 20. The two engaging portions 13 engage in the two guiding grooves 515 of the heat sink 50 which are located at the bottom side of the heat sink 50. Each of the engaging portions 13 comprises an arc-shaped first extending plate 131 and an arc-shaped second extending plate 133. The first extending plate 131 extends inwardly from the top edge of the covering portion 11. The second extending plate 133 extends outwardly from a top end of the first extending plate 131. The first extending plates 131 each form a U-shaped opening (not labeled) which is oriented towards a lateral direction of the bottom cover 10. The second extending plate 133 of the engaging portion 13 is received in a corresponding guiding groove 515 of the heat sink 50 and is slidable along the guiding groove 515. The extending portion 513 of the heat sink 50 is received in the U-shaped opening of the first extending plate 131. Referring to FIG. 2 again, when the top cover 80 and the bottom cover 10 are assembled on the heat sink 50, the covering portions 81, 11 and the heat dissipating plates 51 of the heat sink 50 form an elongated, cylindrical tube.

Each of the holders 40 comprises a cylindrical connecting portion 41 and two spaced, arc-shaped mounting plates 43 extending outwardly from a side of the connecting portion 41. The mounting plates 43 are received in the tube formed by the heat sink 50 and the covering portions 81, 11 of the top and bottom covers 80, 10 and abut against the covering portions 81, 11. Two pins 413 extend though and are fixed on the connecting portion 41. Each of the pins 413 has a first end and a second end opposite to the first end. The first end of the pin 413 is located at an outside of the connecting portion 41. The second end of the pin 413 is enclosed by the two mounting plates 43. The two second ends of the two pins 413 electrically connect with an anode and a cathode of the driving circuit module 20, respectively. The two first ends of the two pins 413 electrically connect with an anode and a cathode of the powder source, respectively.

In assembly, the LED module 60 is mounted on the center of the top surface of the heat absorbing plate 53 of the heat sink 50. The driving circuit module 20 is fixed on the central of the bottom surface of the heat absorbing plate 53 and electronically connects with the LED module 60. The second extending plates 833 of the two engaging portions 83 of the top cover 80 aim to the two guiding grooves 515 of the heat sink 50 which are located at the top side of the heat sink 50 and slide along the guiding grooves 515 until the second extending plates 833 are fully received in the guiding grooves 515. In this state, the extending portion 513 of the heat dissipating plate 51 of the heat sink 50 is received in the U-shaped opening (not labeled) of the first extending plate 831 of a corresponding engaging portion 83. The second extending plates 133 of the two engaging portions 13 of the bottom cover 10 aim to the two guiding grooves 515 of the heat sink 50 which are located at the bottom side of the heat sink 50 and slide along the guiding grooves 515 until the second extending plates 133 are fully received in the guiding grooves 515. In this state, the extending portion 513 of the heat dissipating plate 51 of the heat sink 50 is received in the U-shaped opening (not labeled) of the first extending plate 131 of a corresponding engaging portion 13. The diffuser 70 is subject to an external force, which pushes the diffuser 70 into a space (not labeled) formed by and under the top cover 80. The diffuser 70 is elastically deformed when it pushed into the space; when the external force is released, due to the resilience of the diffuser 70, the diffuser 70 has a tendency to restore to its original configuration whereby the diffuser 70 is firmly attached on the inner surface of the covering portion 81 of the top cover 80 and the opposite lateral sides of the diffuser 70 abut against the inner faces of the first extending plates 831 of the two engaging portion 83. The mounting plates 43 of the holder 40 are received in the tube formed by the heat sink 50 and the covering portions 81, 11 of the top and bottom covers 80, 10 and abut against the inner surfaces of the covering portions 81, 11. Thus, the holders 40, the top cover 80, the bottom cover 10 and the heat sink 50 are assembled together. The two second ends of the two pins 413 electronically connect with the anode and the cathode of the driving circuit module 20. The two first ends of the two pins 413 are provided for electronically connecting with the anode and the cathode of the powder source. Therefore, the assembly of the LED lamp is completed.

The covering portions 81, 11 of the top cover 80 and the bottom cover 10 and the heat dissipating plates 51 of the heat sink 50 form the cylindrical tube. The heat dissipating plates

51 are located at an outside of the tube to dissipate heat of the LED lamp. The LED lamp is symmetrical about a center of the heat absorbing plate 53.

It is to be understood, however, that even though numerous characteristics and advantages of the disclosure have been set forth in the foregoing description, together with details of the structure and function of the disclosure, the disclosure is illustrative only, and changes may be made in detail, especially in matters of shape, size, and arrangement of parts within the principles of the disclosure to the full extent indicated by the broad general meaning of the terms in which the appended claims are expressed.

What is claimed is:

1. An LED (light emitting diode) lamp comprising:

a heat sink;

an LED module mounted on a top side of the heat sink;

a driving circuit module mounted on a bottom side of the heat sink;

a top cover slidably engaging with the heat sink and covering the LED module; and a bottom cover slidably engaging with the heat sink and covering the driving circuit module;

wherein the heat sink comprises two spaced heat dissipating plates and a heat absorbing plate sandwiched between the two heat dissipating plates and connecting with central portions of the heat dissipating plates, respectively, the LED module is mounted on a top surface of the heat absorbing plate, and the driving circuit board module is mounted on a bottom surface of the heat absorbing plate; and wherein two extending portions extend from top and bottom ends of each of the heat dissipating plates to define two guiding grooves between the extending portions and the heat absorbing plate, opposite lateral sides of the top cover and opposite lateral sides of the bottom cover are slidably received in corresponding guiding grooves.

2. The LED lamp as claimed in claim 1, wherein the heat sink is a unitary structure manufactured by an extruding process of a metal.

3. The LED lamp as claimed in claim 1, wherein the top cove has a covering portion and two engaging portions extending downwardly from bottom edges of the covering portion to engage in corresponding guiding grooves of the heat sink.

4. The LED lamp as claimed in claim 3, wherein each of the engaging portions of the top cover comprises an arc-shaped first extending plate extending inwardly from one of the bottom edges of the covering portion and a second extending plate extending outwardly from a bottom end of the first extending plate, the second extending plate is received in a corresponding guiding groove of the heat sink and is slidable along the corresponding guiding groove, and the extending portion of the heat sink is received in an opening defined by the first extending plate.

5. The LED lamp as claimed in claim 4, wherein the bottom cover has a covering portion and two engaging portions extending upwardly from top edges of the covering portion of the bottom cover to engage in corresponding guiding grooves of the heat sink.

6. The LED lamp as claimed in claim 5, wherein each of the engaging portions of the bottom cover comprises an arc-shaped first extending plate extending inwardly from one of the top edges of the covering portion of the bottom cover and a second extending plate extending outwardly from a top end of the first extending plate of the bottom cover, the second extending plate is received in a corresponding guiding groove of the heat sink and is slidable along the corresponding guiding groove, and the extending portion of the heat sink is received in an opening defined by the first extending plate of the bottom cover.

7. The LED lamp as claimed in claim 6, wherein the top cover, the bottom cover and the heat dissipating plates of the heat sink form a cylindrical tube, and the heat dissipating plates are located at outside of the tube.

8. The LED lamp as claimed in claim 7, wherein two holders are mounted on opposite ends of the tube and electronically connect with the driving circuit module.

9. The LED lamp as claimed in claim 1, wherein a number of protruded portions extend downwardly from an inner surface of the covering portion of the top cover.

10. The LED lamp as claimed in claim 1, wherein a diffuser is adhered on an inner surface of the top cover and faces the LED module.

11. The LED lamp as claimed in claim 1, wherein the top cover is made of polycarbonate.

12. The LED lamp as claimed in claim 1, wherein the bottom cover is made of polycarbonate.

13. An LED (light emitting diode) lamp comprising:

a heat sink comprising a heat absorbing plate and a heat dissipation plate, a lateral end of the heat absorbing plate connecting a central portion of the heat dissipation plate, top and bottom ends of the heat dissipation plate extending respectively beyond top and bottom surfaces of the heat absorbing plate and cooperating respectively with the top and bottom surfaces of the heat absorbing plate to define guiding grooves therebetween;

an LED module mounted on the top surface of the heat absorbing plate;

a driving circuit module mounted on the bottom surface of the heat absorbing plate;

a top cover located at a top of the heat absorbing plate and a lateral side thereof slidably engaging in one of the guiding grooves to make the top cover cover the LED module; and a bottom cover located at a bottom of the heat absorbing plate and a lateral side thereof slidably engaging in the other one of the guiding grooves of the heat sink to cover the driving circuit module.

14. The LED lamp as claimed in claim 13, wherein a plurality of fins is protruded outwardly from an outer surface of the heat dissipation plate.

15. The LED lamp as claimed in claim 13, wherein each of the top cover and bottom cover is penetrable by light.

16. The LED lamp as claimed in claim 13, wherein the heat absorbing plate and the heat dissipation plate cooperatively form a T-shaped configuration.

17. The LED lamp as claimed in claim 13 further comprising another heat dissipation plate, the two heat dissipation plates located at lateral sides of the heat absorbing plate, other lateral sides of the top and bottom covers respectively engaging in guiding grooves defined by the another heat dissipation plate and the heat absorbing plate.

18. The LED lamp as claimed in claim 17, wherein the top cover, the bottom cover and the two heat dissipation plates cooperatively form a tube therebetween.

* * * * *